United States Patent [19]
Keijzer et al.

[11] 3,791,495
[45] Feb. 12, 1974

[54] SHOCK ABSORBER WITH PISTON ROD GUIDE AND SEAL MEANS

[75] Inventors: Johan H. Keijzer, Hasselt; Roland H. C. Beets, Truiden, both of Belgium

[73] Assignee: Monroe Belgium N.V., St. Truiden, Belgium

[22] Filed: Apr. 21, 1971

[21] Appl. No.: 136,061

Related U.S. Application Data
[63] Continuation-in-part of Ser. No. 45,867, June 12, 1970, abandoned.

[52] U.S. Cl. .................... 188/322, 277/24, 277/205, 308/3.5
[51] Int. Cl. .................................................. F16f 9/36
[58] Field of Search. 188/322; 308/3.5; 277/24, 205

[56] References Cited
UNITED STATES PATENTS

| | | | |
|---|---|---|---|
| 3,334,549 | 8/1967 | Sheldon | 308/3.5 X |
| 3,527,507 | 9/1970 | Clark et al. | 308/3.5 |
| 3,227,497 | 1/1966 | Heckethorn | 308/3.5 |
| 3,556,617 | 1/1971 | Axthammer et al. | 308/3.5 |

FOREIGN PATENTS OR APPLICATIONS

| | | | |
|---|---|---|---|
| 69,148 | 4/1958 | France | 188/322 |

Primary Examiner—George E. A. Halvosa
Attorney, Agent, or Firm—Harness, Dickey & Pierce

[57] ABSTRACT

A shock absorber comprising an elongated cylindrical pressure cylinder having a piston reciprocally disposed therewithin and connected to a piston rod extending outwardly from one end thereof. The pressure cylinder is adapted to be filled with preselected quantities of a hydraulic damping fluid and a pressurized gas for damping reciprocal movement of the piston therewithin. One end of the pressure cylinder is provided with a novel rod guide assembly which is designed so as to permit the use of extremely economical materials without any sacrificing of sealing efficiency.

3 Claims, 3 Drawing Figures

PATENTED FEB 12 1974 3,791,495
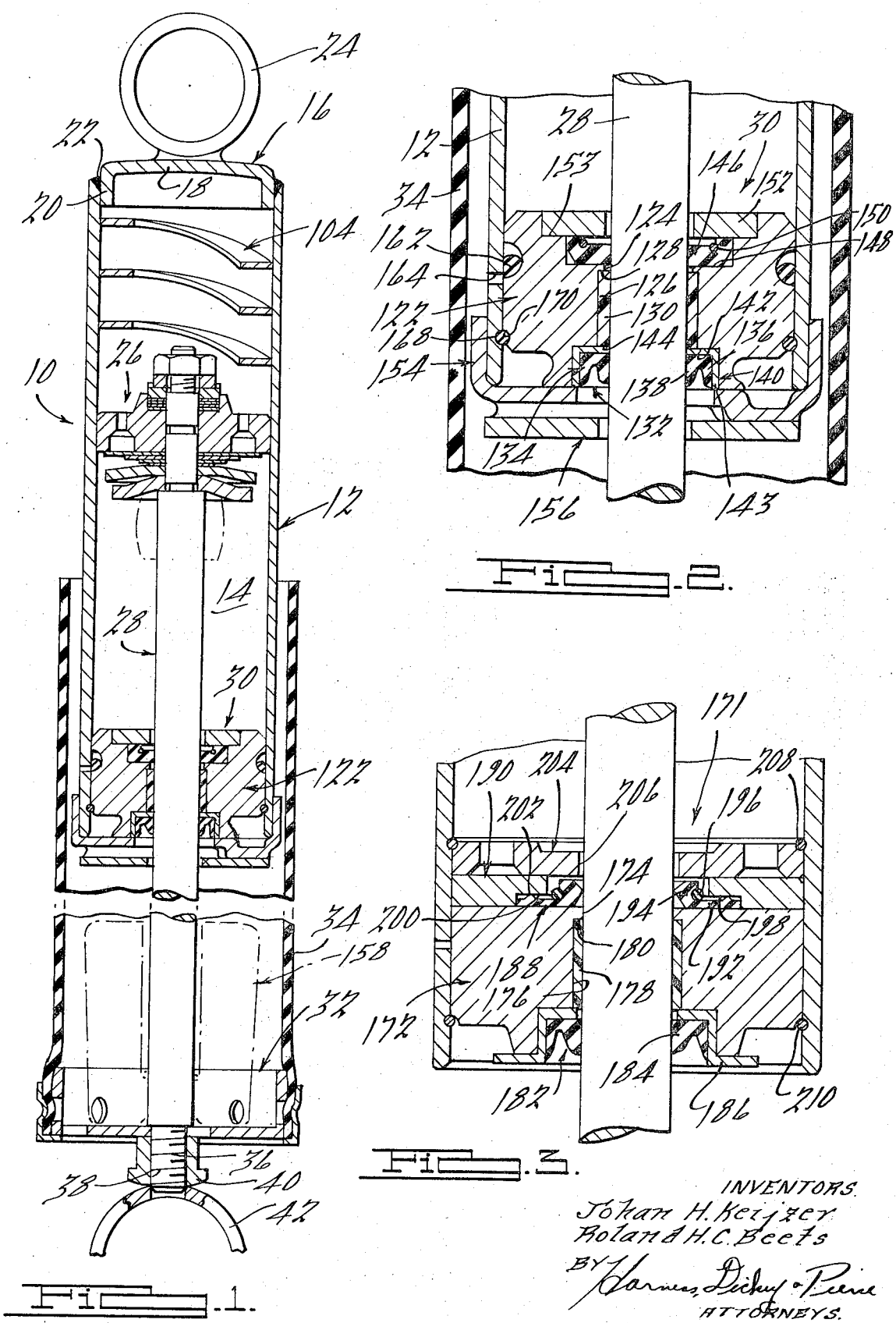
INVENTORS.
Johan H. Keijzer
Roland H.C. Beets
BY Harness, Dickey & Pierce
ATTORNEYS.

SHOCK ABSORBER WITH PISTON ROD GUIDE AND SEAL MEANS

This application is a continuation-in-part application of Ser. No. 45,867, filed June 12, 1970, now abandoned, assigned to the assignee of the present invention.

SUMMARY OF THE INVENTION

The present invention relates generally to shock absorbers of the type used on automotive vehicles and the like for damping relative movement between the sprung and unsprung portions thereof. The shock absorber of the present invention is designed to have the interior thereof provided with a preselected quantity of hydraulic damping fluid and with a preselected quantity of a pressurized gas which cooperate with one another to damping reciprocal movement of a valved piston located within the pressure cylinder. The piston is connected to one end of a piston rod which extends axially outwardly from one end of the cylinder and is supported for longitudinal reciprocal movement by means of a rod guide assembly located at one end of the cylinder. The rod guide assembly is provided with a novel sealing arrangement which provides for fluid tight low-friction peripheral engagement with the outer periphery of the piston rod and is adapted to be operatively mounted within one end of the pressure cylinder in a manner so as to minimize to the extreme, the time and effort required in charging the interior of the cylinder with the aforesaid pressurized gas. The rod guide assembly is designed such that it may be manufactured from extremely economical materials, namely, sintered metal, which may be molded or cast, as opposed to conventional alloys which must be subjected to expensive and time consuming machining operations. Additionally, the subject rod guide assembly may, when utilizing a sintered metal guide body, be provided with an economical sealing arrangement whereby a minimum amount of relatively expensive wear resistant sealing material need be employed.

It is accordingly a general object of the present invention to provide a new and improved shock absorber for use on automotive vehicles and the like.

It is a more particular object of the present invention to provide a new and improved vehicular shock absorber of the above described type which is provided with a novel piston rod guide assembly.

It is still another object of the present invention to provide a new and improved shock absorber of the above described type wherein rod guide assembly is designed so as to permit the use of economical materials.

It is yet a further object of the present invention to provide a new and improved shock absorber of the above character wherein the rod guide assembly is designed to provide highly effective fluid sealing.

It is another object of the present invention to provide a new and improved shock absorber of the above described type which is of a relatively simple design, is easy to assemble and will have a long and durable operational life.

Other objects and advantages of the present invention will become apparent from the following detailed description taken in conjunction with the accompanying drawing.

BRIEF DESCRIPTION OF THE DRAWING

FIG. 1 is a longitudinal cross-sectional view, partially broken away, of a shock absorber embodying the principles of the present invention;

FIG. 2 is an enlarged fragmentary cross-sectional view of one embodiment of the piston rod guide assembly incorporated in the shock absorber of the present invention; and FIG. 3 is an enlarged fragmentary cross-sectional view, similar to FIG. 2, of an alternate embodiment of the piston rod guide assembly incorporated in the shock absorber of the present invention.

DETAILED DESCRIPTION OF THE PREFERRED EMBODIMENT

Referring now in detail to the drawing, a vehicular shock absorber 10, in accordance with an exemplary embodiment of the present invention, is shown as comprising an elongated cylindrical body member or pressure cylinder 12 which defines an internal chamber 14. The upper end of the chamber 14 is closed by a generally cup-shaped end cap 16 which has a generally radially disposed upper section 18 and an annular downwardly projecting flange section 20 that is adapted to be telescopically received within the upper end of the cylinder 12 and be fixedly secured therein, as by welding or the like designated at 22. The end cap 16 has fixedly secured thereto, as by welding or the like, a generally ring-shaped attachment member 24 which is adapted to be secured in a conventional manner to the sprung portion of the associated automotive vehicle, as is well known in the art.

Disposed interiorly of the chamber 14 is a reciprocal piston assembly 26 which is attached to one end of an elongated piston rod 28 that is arranged coaxially of the cylinder 12 and is adapted to reciprocate therewithin along with the piston assembly 26. A detailed description of an exemplary construction and operation of the piston assembly 26 will be found in United States Patent Application, Ser. No. 45,867, which is incorporated by reference herein. The lower end of the pressure cylinder 12 is provided with a rod guide assembly, generally designated 30, which is adapted to support the piston rod 28 for longitudinal reciprocal movement. The outer end of the rod 28 is provided with an end cap assembly, generally designated 32, which carries a generally cylindrically shaped enclosure member or dirt shield 34 that is arranged coaxially of the cylinder 12 and partially surrounds the lower end thereof, as best seen in FIG. 2. The lower end of the piston rod 28 is formed with a reduced diameter, externally threaded section 36 which is adapted to be threadably received within an internally threaded bore 38 of an annular collar member 40 which is secured as by welding or the like to an annular attachment member 42. The member 42 is adapted to be secured in a conventional manner to the unsprung portion of the associated automotive vehicle in a manner well known in the art and thereby functions along with the attachment member 24 in operatively supporting the shock absorber 10 of the present invention interjacent the sprung and unsprung portions of the vehicle, whereby the assembly 10 will function to effectively damp relative movement therebetween.

The interior of the chamber 14 is adapted to be filled with a preselected quantity of hydraulic fluid and is also adapted to be charged with a pressurized gas, such as compressed air, nitrogen or the like. In order to minimize aeration or foaming of the hydraulic fluid which occurs upon reciprocal movement of the associated piston within the pressure cylinder, a helical baffle member, generally designated by the numeral 104, is disposed within the chamber 14 interjacent the upper side of the piston assembly 26 in the end cap 16, the baffle member 104 preferably being of a construction and functioning in the manner described in the aforementioned copending patent application, Ser. No. 45,867.

Referring now in detail to the construction and operation of the rod guide assembly 30, as best seen in FIGS. 1 and 2, the assembly 30 comprises an annular body member 122 which is formed with a central annular bore 124 through which the piston rod 28 extends. The lower end of the bore 124 is formed with an enlarged diameter counterbore 126 which defines a generally radially disposed shoulder 128. Disposed within the counterbore 126 is an annular or sleeve-shaped lining member 130 which has the inner periphery thereof slidingly peripherally engaged with the outer periphery of the piston rod 28, as illustrated. The lining member 130 is fabricated of a suitable low-friction material, such as teflon which is provided with a suitable rigidifying material such as carbon or the like, whereby to provide for low frictional resistance of reciprocal movement of the piston rod 28 relative to the assembly 30. The lining member 130 is adapted to be secured within the body member 122 by being axially retained between the shoulder 128 and a wiper assembly, generally designated 132, that is mounted at the lower end of the body member 122. The wiper assembly 132 comprises an annular wiper member 134 which is arranged circumjacent the periphery of the piston rod 28 and is fabricated of a suitable resilient deformable material such as rubber or the like. The member 134 comprises outer and inner peripheral lip portions 136 and 138, respectively, the latter of which is adapted for compressive engagement with the outer periphery of the piston rod 28 in a manner so as to "wipe" any road dirt, moisture or any other foreign material off from the outer periphery of the piston rod 28 as the same moves upwardly into the pressure cylinder 12. Thus, the wiper member 134 prevents any dirt or other foreign material from ingressing between the outer periphery of the piston rod 28 and the inner periphery of the lining member 130 to prevent possible scoring or other damage to the mutually confronting surfaces of either of these components. The wiper member 134 is adapted to be retained within the lower side of the body member 122 by means of an annular wiper housing 140 which is disposed within an enlarged diameter annular counterbore 142 formed in the lower side of the body member 122. The housing 140 comprises a generally axially extending section 143 which extends around the outer periphery of the lip portion 136 and a generally radially disposed flange section 144 which projects radially inwardly above the wiper member 134 and abuttingly engages the lower end of the lining member 130, as illustrated.

Disposed within the upper end of the body member 122 is an annular fluid seal 146 which is nestingly received within a suitable counterbore 148 formed around the upper end of the bore 124. The seal is preferably provided with a retaining or garter spring 150 which assures positive sealing engagement thereof with the outer periphery of the piston rod 28 to prevent any hydraulic fluid from passing downwardly through the bore 124 upon reciprocation thereof. An annular retaining ring 152 is disposed within a suitable complementary-shaped annular recess 153 provided in the top of the body member 122 for operatively securing the seal 146 in place.

The entire rod guide assembly 30 is adapted to be received within the lower end of the pressure cylinder 12 and be secured therein by a suitable retaining cap or the like, generally designated 154, which may be secured over the lower end of the cylinder 12 and be secured thereto by any suitable means. The cap 154 may be provided with a bearing plate 156 on the lower side thereof adapted for abutting engagement with a resilient deformable compression bumper 158 which may be provided in the lower end of the dirt shield 34, as illustrated.

In order to change or induce pressurized gas into the interior of the chamber 14, a suitable opening or gas port 164 is formed in the wall of the cylinder 12 adjacent the lower end thereof, as best seen in FIG. 2. In order to perform the gas charging operation, the unitized assembly consisting of the body member 12, wiper assembly 132, liner 130, fluid seal 146 and retaining ring 152, is inserted axially within the lower end of the pressure cylinder 12, as described in copending United States Patent Application, Ser. No. 45,867. After the charging or filling operation has been completed and a predetermined quantity of pressurized gas has been introduced into the chamber 14, the aforementioned assemblage may be biased axially upwardly within the lower end of the pressure cylinder 12, which results in the O-ring sealing member 162 being moved axially past the port 164 to a position located axially thereabove, whereby to prevent any gas leakage from the chamber 14 through the port 164. The entire assemblage may then be operatively secured within the lower end of the pressure cylinder 12 by means of a suitable retaining and/or sealing ring 168 which is adapted for nesting reception within a suitable recess 170 defined between the inner periphery of the cylinder 12 and the outer periphery of the body member 122, after which time the retaining cap 154, etc. may be operatively mounted.

Referring now to FIG. 3, a slightly modified embodiment of the aforementioned rod guide assembly is illustrated and generally designated by the numeral 171. As illustrated, the assembly 171 comprises an annular body member 172 which is similar in construction and function to the aforedescribed body member 122 and is formed with a central annular bore 174 through which the associated piston rod, such as the piston rod 28, extends. The lower end of the bore 174 is formed with an enlarged diameter counterbore 176 within which an annular or sleeve-shaped lining member 178 is disposed. The member 178 is preferably fabricated of the same or a similar low friction material as the aforedescribed lining member 130, whereby to provide for low frictional resistance of reciprocal movement of the piston rod relative to the assembly 171. The member 178 is adapted to be secured within the body member 172 by being axially retained between a radially extending shoulder 180 defined at the upper end of the counterbore 176, and a wiper assembly, generally designated by the numeral 182. The assembly 182 may be similar in construction and operation to the aforedescribed assembly 132 and is representatively shown as comprising an annular, resilient wiper member 184 and a wiper housing, as above described.

In order to minimize the manufacturing expenses of the rod guide assembly 171, the body member 172 is preferably fabricated of sintered metal which may be molded or cast by well known techniques, and which, as will be apparent to those skilled in the art, are substantially more economical then the machining operations that would be required if the body member 172 were fabricated of a conventional metal or metal alloy. Due to the fact that sintered metal has a tendency to be porous, in the instant application of this material, the body member 172 would tend to permit pressure loss in the absence of an associated sealing means. In order to obviate the possibility of a loss of pressure from occurring, the rod guide assembly 171 is provided with a novel sealing means adjacent the upper side of the body member 172 which provides a positive fluid tight seal. More particularly, the aforesaid sealing means comprises a pair of annular or ring shaped, concentrically oriented sealing elements 188 and 190, the former of which comprises a generally radially disposed portion 192 which extends radially outwardly along the upper surface of the body member 172, and an annular sealing lip portion 194 adapted for peripheral sealing engagement with the outer periphery of the associated piston rod. If desired, a suitable garter spring or the like 196 may be provided circumjacent the lip portion 194 to enhance the sealing effectiveness thereof. As illustrated in FIG. 3, the sealing element 190 extends around the radially outer side of the sealing element 188 and also bears upon the upper surface of the body member 172. The underside of the radially inner edge of the sealing element 190 is undercut, as seen at 198, whereby to nestingly receive the radial portion 192 of the sealing element 188. The undercut 198 defines a generally radially extending surface 200 adapted for fluid tight sealing engagement with an axially upwardly extending sealing boss 202 formed on the upper surface of the portion 192 of the sealing element 188. In order to positively secure the sealing elements 188, 190 in their respective operative positions shown in FIG. 3, the rod guide assembly 171 is provided with an annular or disc shaped retaining member 204 which is formed with a central annular opening 206 arranged in clearance relation with respect to the outer periphery of the associated piston rod, the outer periphery of the retaining member 204 being juxtapositioned the inner periphery of the associated pressure cylinder, such as the pressure cylinder 12, and being retained therein by a suitable retaining ring 208 which cooperates with an associated axially spaced ring 210 to axially position the entire guide assembly 171.

While it will be appreciated that the sealing means consisting of the sealing elements 188 and 190 may comprise a single unitized member, the aforedescribed arrangement provides for a considerable cost savings without any sacrifice in the sealing effectiveness of said sealing means. The reson for this is that the inner periphery of the sealing means is adapted to sealingly engage the outer periphery of the associated reciprocable piston rod, and accordingly, a higher wear resistant, and thus expensive rubber (or other suitable) compound is required. On the other hand, the outer periphery of such sealing means need only provide a fluid tight seal between the inner periphery of the pressure cylinder and the outer periphery of the body member 172 and thus need not be fabricated of a high wear resistant compound. By utilizing the above described construction of the sealing means incorporated in the rod guide assembly 171, the size of the inner sealing element 188 is reduced to a minimum so that a minimum amount of the relatively more expensive rubber compound need be used, while the remaining sealing functions may be accomplished by the sealing element 190 which can be fabricated of a fluid impervious sealing material of much less expensive construction. Thus, a considerably overall cost savings is achieved, and the total manufacturing expenses of the entire rod guide assembly 171 may be substantially reduced by virtue of utilization of a sintered metal body member 172 and multiple fluid seals provided by the sealing elements 188 and 190.

While it will be apparent that the preferred embodiments illustrated herein are well calculated to fulfill the objects above stated, it will be appreciated that the present invention is susceptible to modification, variation and change without departing from the scope of the invention.

We claim:

1. In combination in a hydraulic shock absorber,
   a hollow cylinder member,
   a piston reciprocable within said member,
   a piston rod connected to said piston and extending axially outwardly from one end of said member,
   an annular rod guide secured within and closing one end of said cylinder member and defining an axially extending bore through which said piston rod extends,
   a cylindrical anti-friction bushing fabricated of low coefficient of friction polymeric material secured within said bore,
   first and second enlarged diameter annular chambers located one at each end of said rod guide and oriented coaxially of said bore,
   one of said chambers being defined by a counterbore in said rod guide and having a generally cup-shaped seal support member disposed therewithin and abuttingly engaged with one axial end of said bushing for preventing axial movement thereof toward said counterbore,
   a first annular elastomeric member disposed within said one chamber and having an inner peripheral portion slidably engaged with the outer periphery of said piston rod,
   a radial shoulder projecting interiorly of said bore at the end thereof opposite said counterbore,
   said shoulder being abuttingly engaged with the other axial end of said bushing, whereby said bushing is retained between said shoulder and said cup member against any axial displacement relative to said guide member,
   a second annular elastomeric member disposed within the other of said annular chambers and having an inner peripheral portion slidably engaged with the outer periphery of said piston rod, and
   a generally radially disposed retaining plate secured within said cylinder member adjacent one of said annular elastomeric members and extending radially thereover for retaining the same in said other annular compartment.

2. The invention as set forth in claim 1 wherein said seal support member includes a radial section engaged with one axial end of said bushing and an axial section engaged with the axially extending surface of said counterbore.

3. The invention as set forth in claim 2 wherein said seal support member is pressfitted within said counterbore.

* * * * *